United States Patent
Abadi et al.

(10) Patent No.: US 11,288,044 B1
(45) Date of Patent: Mar. 29, 2022

(54) SYSTEM AND METHOD FOR INTERPROCEDURAL ANALYSIS

(71) Applicant: WHITESOURCE LTD., Givatayim (IL)

(72) Inventors: Aharon Abadi, Givatayim (IL); Bar Makovitzki, Givatayim (IL); Ron Shemer, Givatayim (IL)

(73) Assignee: WHITESOURCE LTD., Givatayim (IL)

(*) Notice: Subject to any disclaimer, the term of this patent is extended or adjusted under 35 U.S.C. 154(b) by 0 days.

(21) Appl. No.: 17/325,604

(22) Filed: May 20, 2021

(51) Int. Cl.
  *G06F 9/44* (2018.01)
  *G06F 8/41* (2018.01)
  *G06F 8/75* (2018.01)

(52) U.S. Cl.
  CPC .............. *G06F 8/433* (2013.01); *G06F 8/436* (2013.01); *G06F 8/4434* (2013.01); *G06F 8/75* (2013.01)

(58) Field of Classification Search
  None
  See application file for complete search history.

(56) References Cited

U.S. PATENT DOCUMENTS

| | | | |
|---|---|---|---|
| 8,984,475 B2* | 3/2015 | Ryu | G06F 12/0223 717/106 |
| 2010/0058301 A1* | 3/2010 | Myles | G06F 8/41 717/142 |
| 2017/0357429 A1* | 12/2017 | Dixon | G06K 9/00865 |
| 2021/0191840 A1* | 6/2021 | Shah | G06F 8/433 |
| 2021/0232377 A1* | 7/2021 | Bae | G06F 8/433 |

* cited by examiner

*Primary Examiner* — Qamrun Nahar
(74) *Attorney, Agent, or Firm* — The Roy Gross Law Firm LLC; Roy Gross

(57) ABSTRACT

A computer-implemented method, system and computer program product, the method comprising: obtaining a representation of computer code; analyzing the computer code using a first algorithm to obtain a call graph; subject to the call graph not complying with a stopping criteria: analyzing a part of the computer code using a second algorithm to obtain further edges for the at least one second node; and combining the further edges with the call graph, to obtain a second call graph; and outputting the second call graph.

20 Claims, 3 Drawing Sheets

SYSTEM AND METHOD FOR INTERPROCEDURAL ANALYSIS

TECHNICAL FIELD OF THE INVENTION

The present disclosure relates to analyzing computer code in general, and to a system and method for generating a call graph from computer code, in particular.

BACKGROUND OF THE INVENTION

Interprocedural analysis refers to gathering information about an entire program rather than only a single procedure as done in intraprocedural analysis. Interprocedural analysis enables a more precise analysis of the program and may be used for a variety of applications.

An important tool in interprocedural analysis is a call graph, also referred to as a control flow graph, which represents calling relationships between code units such as one or more programs, executables, libraries, methods, functions, subroutines, procedures, or the like. The graph may be represented as a collection of nodes and edges, wherein each node represents a code unit, and a directed edge from node f to node g indicates that unit f calls unit g. A cycle in the graph may thus indicate recursive procedure calls.

Call graphs have many usages, such as but not limited to: optimizing compilers, detecting compile-time errors, detecting dead-code such as units that are never called, determining program coverage, detect anomalies of program execution possibly generated by attacks, tracking the flow of values between procedures, documenting a program, or the like.

Call graphs may be generated in a dynamic or static manner. A dynamic call graph may be generated upon one or more executions of a program containing the tested units, as output for example by a profiler. Thus, a dynamic call graph can be accurate, meaning that it represents exactly the called units, which is particularly important in languages such as Python, Java, C++, C# or the like. However, it may not be exhaustive as it may represent only the calls occurring in the particular situations that have been executed, and may not represent other calls that may occur in other executions.

A static call graph may represent the calls in all possible executions of the program. However, currently known techniques generally create over-approximations, i.e., the graph represents all calling relationships that may occur, and possibly also call relationships that would never occur in actual runs of the program.

Programs written in dynamically typed languages, such as Python, present additional challenges to creating static call graphs. A name-based call graph that uses method names alone as node identifiers is insufficient, due for example to the dynamic polymorphism enabling different methods having the same name, functional style programming, or the like.

Call graphs can be defined to represent varying degrees of precision. A more precise call graph more precisely approximates the behavior of the real program, at the possible cost of taking more time and computing resources.

SUMMARY OF THE INVENTION

One exemplary embodiment of the disclosed subject matter is a computer-implemented method comprising: obtaining a representation of computer code; analyzing the computer code using a first algorithm to obtain a call graph; subject to the call graph not complying with a stopping criteria: analyzing a part of the computer code using a second algorithm to obtain further edges for the at least one second node; and combining the further edges with the call graph, to obtain a second call graph; and outputting the second call graph. Within the method, the stopping criteria is optionally that the call graph comprises one or more first nodes associated with one or more resolved targets and one or more second nodes associated with one or more unresolved targets. Within the method, the second method optionally requires more resources than the first method. The method can further comprise: subject to the second call graph comprising at least one third node associated with an unresolved target: analyzing the computer code using a third algorithm to obtain additional edges for the at least one third node; and combining the additional edges with the second call graph, thereby obtaining a third call graph comprising the call graph, the further edges and the additional edges. Within the method, the first algorithm is optionally a class hierarchy analysis, the second algorithm is a point-to analysis and the third algorithm resolves dynamic method calls. Within the method, the first algorithm is optionally a file dependency analysis, the second algorithm is a type inference analysis and the third algorithm is a point-to analysis. Within the method, the first algorithm is optionally a file dependency static analysis, name-based analysis or class hierarchy analysis. Within the method, the first algorithm or the second algorithm is optionally a class hierarchy analysis. Within the method, the second algorithm is optionally dynamic analysis or point-to analysis. Within the method, the third algorithm is optionally a type inference analysis or dynamic analysis.

Another exemplary embodiment of the disclosed subject matter is a computerized apparatus having a processor, the processor being adapted to perform the steps of: obtaining a representation of computer code; analyzing the computer code using a first algorithm to obtain a call graph; subject to the call graph not complying with a stopping criteria: analyzing a part of the computer code using a second algorithm to obtain further edges for the at least one second node; and combining the further edges with the call graph, to obtain a second call graph; and outputting the second call graph. Within the apparatus, the stopping criteria is optionally that the call graph comprises at least one first node associated with at least one resolved target and at least one second node associated with an unresolved target. Within the apparatus, the second method optionally requires more resources than the first method. Within the apparatus, the processor is optionally further configured to: subject to the second call graph comprising at least one third node associated with an unresolved target: analyze the computer code using a third algorithm to obtain additional edges for the at least one third node; and combine the additional edges with the second call graph, thereby obtain a third call graph comprising the call graph, the further edges and the additional edges. Within the apparatus, the first algorithm is optionally a class hierarchy analysis, the second algorithm is a point-to analysis and the third algorithm resolves dynamic method calls. Within the apparatus, the first algorithm is optionally a file dependency analysis, the second algorithm is a type inference analysis and the third algorithm is a point-to analysis. Within the apparatus, the first algorithm is optionally a file dependency static analysis, name-based analysis or class hierarchy analysis. Within the apparatus, the first algorithm or the second algorithm is optionally a class hierarchy analysis, dynamic analysis or point-to analysis. Within the apparatus, the third algorithm is optionally a type inference analysis or dynamic analysis.

Yet another exemplary embodiment of the disclosed subject matter is a computer program product comprising a computer readable storage medium retaining program instructions, which program instructions when read by a processor, cause the processor to perform a method comprising: obtaining a representation of computer code; analyzing the computer code using a first algorithm to obtain a call graph; subject to the call graph not complying with a stopping criteria: analyzing a part of the computer code using a second algorithm to obtain further edges for the at least one second node; and combining the further edges with the call graph, to obtain a second call graph; and outputting the second call graph.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION OF THE INVENTION

Figure 1A:
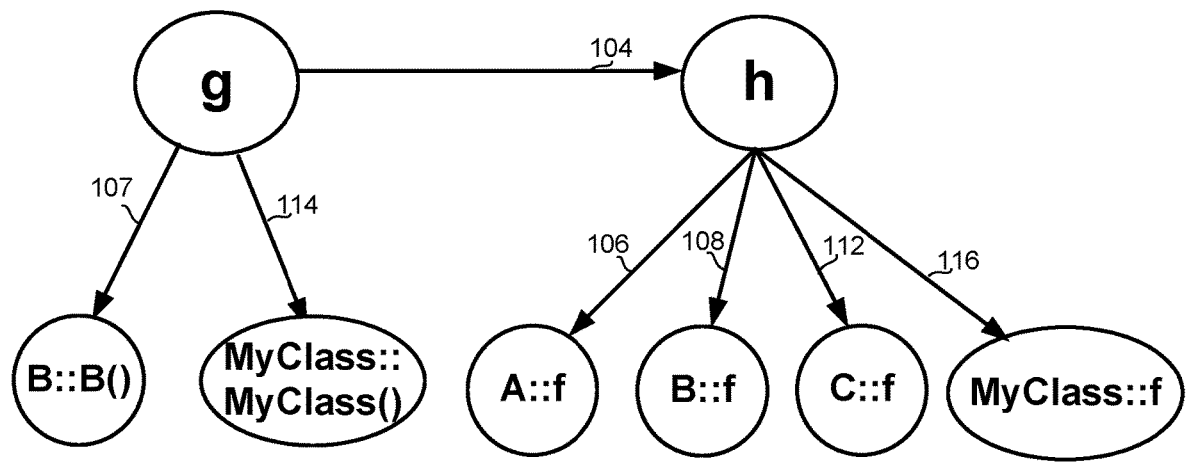
FIG. 1A shows a call graph generated by full class hierarchy analysis, in accordance with some exemplary embodiments of the subject matter.

A call graph is a representation of the invocation relationship between code comprised within programs, files, libraries, methods, functions or other units. In some embodiments, each node represents such unit, and an edge directed from node A to node B represents that the unit represented by node A calls or otherwise invokes the unit represented by node B. A call graph may be implemented as a data structure and/or contents of a database, indicating the calling relationships. A graph may also have a graphical representation.

One technical problem dealt with by the disclosed subject matter is the need to generate a call graph from computer code, in order to get insights into the code. A call graph may be used for a variety of purposes, such as but not limited to optimizing compilers, detecting compile-time errors, detecting dead-code such as units that are never called, determining program coverage, detect anomalies of program execution possibly generated by attacks, tracking the flow of values between procedures, documenting a program, or the like.

Another technical problem dealt with by the disclosed subject matter is the need for the call graph generation to be cost effective, e.g., to produce highly accurate graph using as little resources as possible. Dynamic solutions are analyzing the code as it runs, and may therefore produce partial solutions, i.e., some of the feasible paths in the program might not be found. Other solutions are sound, i.e., ensure that all possible calling relationships are detected, but may also generate some infeasible calling relationships. Thus, it is required to balance the coverage, i.e., the need to contain all edges that can occur, with the accuracy, i.e., the need for the graph not to contain edges representing calls that cannot occur, and with the time, memory and other consumed resources.

Yet another technical problem dealt with by the disclosed subject matter is the need to be able to generate a call graph before the computer code is executable, compilable or even fully coded, or when is known to contain bugs. This requirement provides for the solution to be useful for eliminating problems throughout the code development cycle, and particularly at early stages when corrections are easier and cause minimal harm to the code.

Yet another technical problem dealt with by the disclosed subject matter is the need to generate a call graph for any programming language, including static as well as dynamic typed languages, such that whether a variable type may be checked at compile time or at run time.

One technical solution comprises obtaining computer code to be analyzed. The computer code may then be processed using a first algorithm which may obtain an initial call graph. The first algorithm may be static and fast.

It may then be determined whether the resulting graph complies with a stopping criteria, indicating whether the resulting graph needs further refinement or not. An exemplary stopping criterion may be the absence of unresolved targets. An unresolved target may occur, for example, in an environment with inheritance, where both an ancestor and a descendant implement a particular interface, and it cannot be determined by the first algorithm whether the implementation of the ancestor, the descendent or both can be called.

If the first algorithm is successful and no target remains unresolved, the call graph is complete.

If, however, the call graph comprises unresolved targets, then a second algorithm may be employed for generating one or more sub-graph rooted at the parts of the code where the previous analysis was not precise enough or failed to resolve a target. In some embodiments, the second algorithm may be more accurate but more expensive in time or computing resources than the first algorithm. The complete graph may then be combined from the resolved parts produced by the first algorithm, and the sub-graphs produced by the second algorithm.

If the sub-graph produced by the second algorithm is still not accurate enough, or comprises unresolved targets, then a third algorithm, which may be more accurate than the second one, may be used for the unresolved targets, and produce one or more further sub graphs. The resulting total graph may then be comprised of areas produced by the first, second and third algorithms. It will be appreciated that the process can continue with further algorithms, such that each area of the graph is produced by the algorithm that provides sufficient results and may or may not be the least demanding regarding computational complexity or other considerations.

In some embodiments, the call graph may be generated as much as possible based on static analysis. Only if static analysis provides insufficient results, e.g. a graph that does not meet a stopping criteria, dynamic analysis may take place for completing missing parts of the call graph.

In some exemplary embodiments, a first algorithm may include class hierarchy analysis, a second algorithm may include point-to analysis and a third algorithm may resolve dynamic method calls.

In further exemplary embodiments, a first algorithm may include file analysis, a second algorithm may include type analysis and a third algorithm may include point-to analysis.

One technical effect of the disclosure provides for a method that produces a call graph in an incremental manner, such that algorithms are used to the degree where they produce satisfactory results, and additional algorithms may be used upon need in specific locations, thus reducing the overall resource consumption of the method, while ensuring that the accuracy of the results is satisfactory. The solution thus provides a high tradeoff between scalability and precision.

Yet another technical effect of the disclosure relates to producing the call graph for programs at any stage of the development cycle. The analyzed code may or may not be executable, compilable or even complete, thus providing for a tool that can help detect problems in an early stage where it is least expensive and most effective to correct them.

Yet another technical effect of the disclosure relates to producing the call graph for programs coded in any static or dynamic ally typed computer language.

In some embodiments, whether a graph is accurate may be evaluated as follows: if a single method invocation in the code adds more than a predetermined number k of edges or another criteria, the graph may be determined to be inaccurate, and a more accurate and expensive method may be employed for further exploring the inaccurate area while utilizing the results calculated thus far and continuing therefrom. Further exploring areas may relate to adding at least one edge from an existing vertex to another exiting edge or to a newly added vertex.

Class Hierarchy Analysis (CHA) refers to the declared type of a variable (the receiver object) that is used to invoke the dynamic dispatch, and restricts call edges to the inherited method implementation, or the methods declared in the subtype hierarchy of the declared type of the receiver object. However, CHA may generate redundant edges, since some calls may not be resolved to a direct call, since CHA examines the class hierarchy to determine what classes of object can be pointed at by a reference declared to be of class A. For example, in Java the classes may include the subtree in the inheritance hierarchy rooted at A, and find out what methods may be called at a virtual call site. CHA operates under the assumption that the entire inheritance hierarchy is available. Depending on the specific hierarchy, CHA may transform a virtual call into a direct call where there is a single choice of matching function. CHA may ignore the flow of control in a program, and may thus introduce further calls that never occur in actual execution.

Type inference analysis refers to examining the code which may be without type information, followed by inferring the most general types that can be declared. Traditional type inference parses the code to build a parse tree, and then assigns type variables to nodes in the tree. The next step may be to generate constraints for the variable types. The constraints may be generated from the environment, comprising for example literals, built-in operators, known functions, or the like. Further constraints may be generated in accordance with the form of the parse tree: for example application and abstraction nodes. Once the constraint system is available, it may be solved, for example using unification, and the types of the declarations may be determined. Type inference analysis thus reduces the syntactic overhead of expressive types, and is guaranteed to produce the most general type.

Point-to analysis, also referred to as pointer analysis, is a static code analysis algorithm that establishes which pointers, or heap references, can point to which variables, or storage locations. Point-to analysis algorithms are used to convert collected raw pointer usages (e.g., assignments of one pointer to another or assigning a pointer to point to another one) to a graph indicating what each pointer can point to.

The two primary algorithms of point-to analysis are Steensgaard's algorithm and Andersen's algorithm. For large programs, some tradeoffs may be necessary to make the analysis perform in reasonable time and space. Examples of how the tradeoffs are handled may include: field insensitivity or structure insensitivity which treats all references from a structured object as being from the object as a whole; and context-insensitive pointer analysis or flow-insensitive pointer analysis which ignore the flow of control when analyzing which objects are assigned to pointers. Utilizing the point-to analysis on smaller code segments where it is necessary, may reduce the need to handle the tradeoff, and may provide satisfactory results while complying with the limitations of available resource.

Figure 1B:
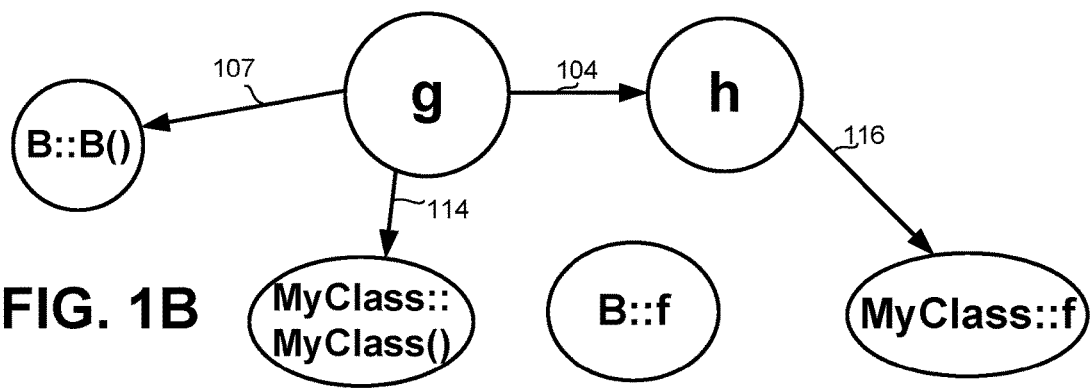
FIG. 1B shows the call graph of FIG. 1A without excess edges, in accordance with some exemplary embodiments of the subject matter.
Figure 1C:
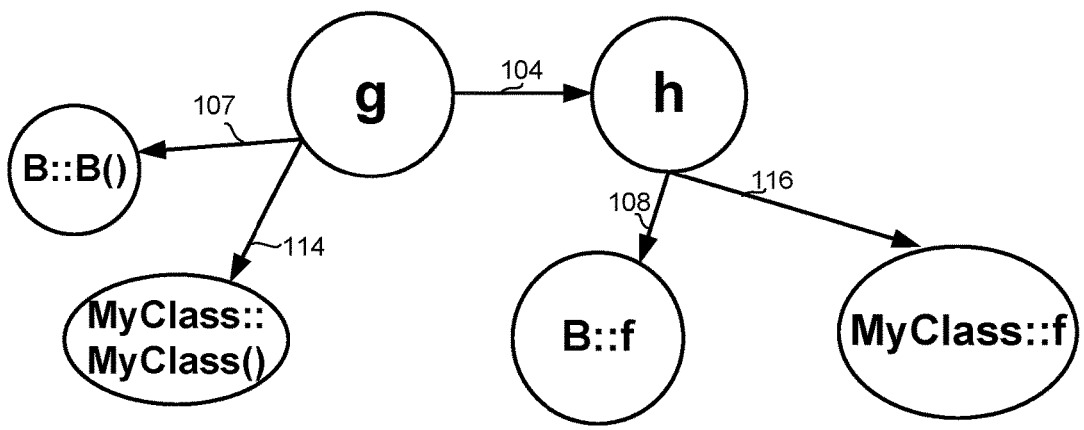
FIG. 1C shows the call graph of FIG. 1B with additional edges created by a second algorithm, in accordance with some exemplary embodiments of the subject matter.

Referring now to FIGS. 1A-1C and to Listing 1 below, showing an example of code listing and associated call graphs.

```
1 Class MyClass {
2 void f ( );
3 }
4
5 interface A {
6 void f ( );
7 }
8
9 class B implements A {
10 void f ( ){
11 ...
12 }
13 }
14 class C implements A {
void f ( ){
16 ...
17 }
18 }
19
20 h (A a, MyClass m){
21 a.f ( );
22 m.f ( );
23 }
24
25 g ( ){
26 h (new B ( ), new MyClass ( ));
27 }
```

Listing 1

Executing full class hierarchy analysis (CHA) on methods g and h creates the graph shown in FIG. 1A, comprising edge g→h 104 (line 26), edge h→A::f 106, edge g→B:: B( ) 107, edge h→B::f 108, edge h→C::f 112 (line 21), edge g→MyClass:: MyClass( ) 114, and edge h→MyClass::f 116 (line 22). However, edges h→A::f 106 and h→C::f 112 are excess, since no instance of class A or C is generated and thus no method of Class A or C can be called. Therefore the result of using CHA alone is less accurate. If k, the number of edges created by a single invocation is limited to 1 or even 2, then only the constructors and the call to m.f( ) (line 22) are handled by CHA, and only the edge h→MyClass::f 116 may be added, as shown in FIG. 1B, while the call to a.f( ) (line 21) will not be resolved by CHA.

Then, since the call remains unresolved, a second and more accurate and expensive method, for example the type inference method, may be called. The second method is activated only for a.f( ) (line 21), and adds only h→B::f edge 108 to the graph, as shown on FIG. 1C, which is more accurate than the graph of FIG. 1A. Moreover, by not activating the expensive second method for already resolved parts, such as m.f( ) (line 21), time and computing resources are saved. The result is an accurate and scalable method for generating a call graph.

Referring now to Listing 2 below.

```
1 public delegate void Del (string message);
2 // Create a method for a delegate.
3 public static void DelegateMethod (string message)
4 {
5 Console.WriteLine(message);
6 }
7 public static void Main (string [ ] args){
8 // Instantiate the delegate.
9 Del handler=DelegateMethod;
10 // Call the delegate.
11 handler("Hello World");
12 CallToDelegateFreeCode( );
13 }
14 private static void CallToDelegateFreeCode 0
15 {
16 . . .
17 }
```

Listing 2

In the example of Listing 2, handler (defined on line 9) is a pointer to a function. CHA is incapable of resolving the call to handler at line 11, since the type of handler is a delegate and there is no class-hierarchy relation between Del and DelegateMethod. Thus, this call may be handled and resolved with the type-inference algorithm.

It will be appreciated that where neither CHA nor type inference are able to resolve calls, further algorithms may be activated. However, as algorithms which are more resource consuming are activated for as small as possible code areas, the overall resource consumption of generating the call graph may be handled by the available resources.

Figure 2:
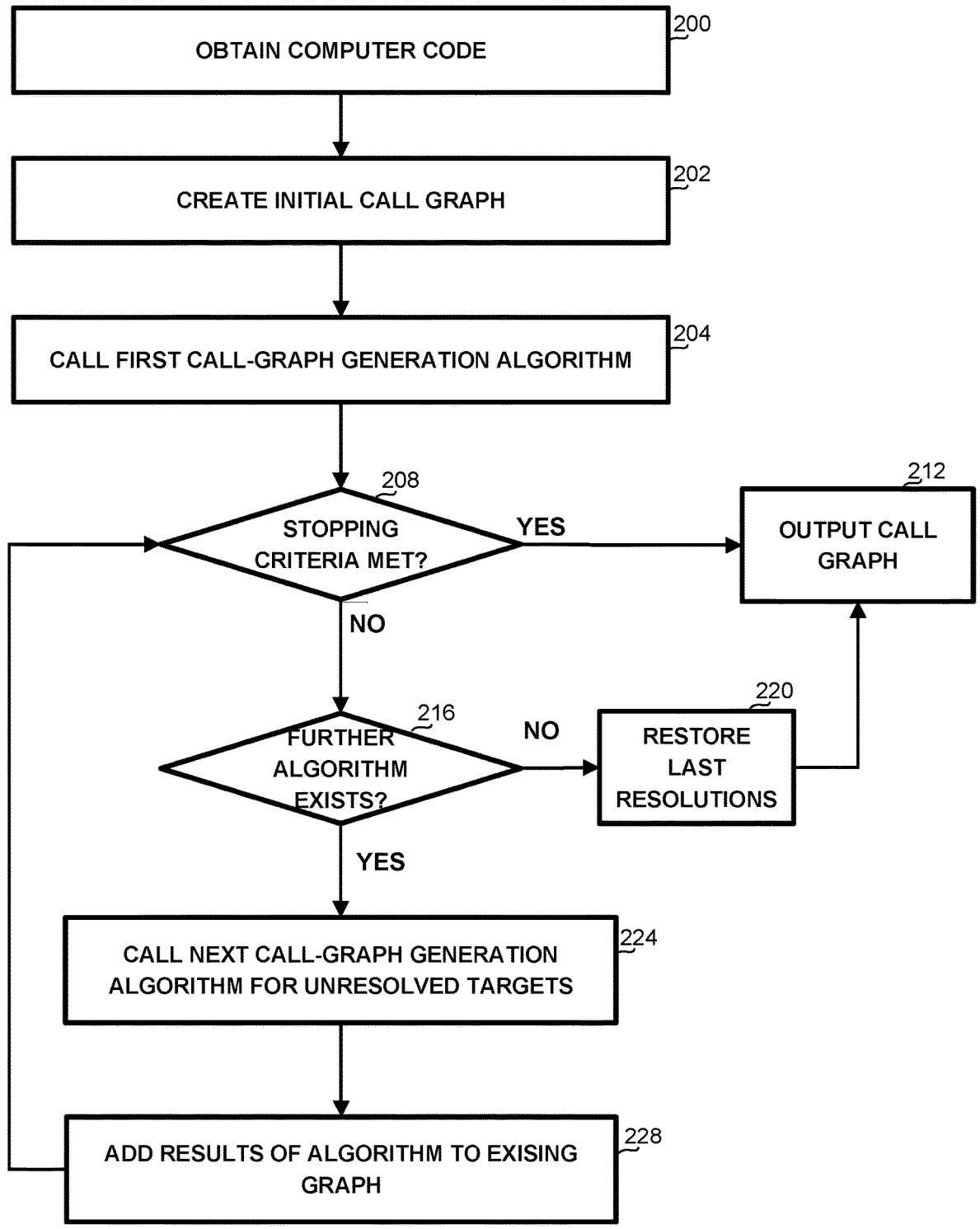
FIG. 2 is a flowchart of steps in a method for generating a call graph, in accordance with some exemplary embodiments of the subject matter.

Referring now to FIG. 2, showing a flowchart of steps in a method for generating a call graph, in accordance with some embodiments of the disclosure.

In the disclosure below the term algorithm relates to a computerized implementation of a process or method, which can be executed upon one or more locations in a user's code.

On step 200, a representation of computer code may be obtained. The representation may be the computer code itself, a graphic representation, or the like. The code may be obtained in any manner, such as read from a file, transmitted over a communication network, typed by a programmer, for example while using an Integrated Development Environment (IDE), or the like. The code may be in any programming language, such as but not limited to Python, Java, C, C++, C# or the like.

On step 202, an initial call graph may be created, comprising a node for each unit, such as a file, function, method, procedure or another executable unit within the computer code, and no edges.

On step 204, a first call graph generation algorithm may be called. The algorithm may be the least resource consuming algorithm available, for example CHA.

The algorithm may be activated on the entire code for which a call graph is to be generated. For each resolved target, one or more edges may be added to the graph.

On step 208 it may be determined whether a stopping criteria is met. Stopping criteria may be numeric or other. For example, one stopping criteria may relate to the absence of unresolved targets. An unresolved target may be an instruction in the code for which more than a predetermined or dynamically determined number, k, of options for resolving the call, exist. For example, if k=1, then any location within the code for which two or more options exist is an unresolved target and no edges will be added for this target. In another example, a stopping criterion may not be met if one or more functions within one or more packages are not called.

If no unresolved targets exist, the call graph is complete and may be output on step 212.

The call graph may be output as a list comprising the possible resolutions for each call in the original code, displayed to a user, stored within a file, or the like.

In some embodiments, a graphic representation of the graph may be provided and optionally displayed to a user.

If there are unresolved targets, then on step 216 it may be determined whether a further call-graph generation algorithm exists, which is more accurate than the ones already activated, and which has not been run on one or more of the unresolved targets. If no such algorithm exists, then on step 220 the latest locations, for which edges have not been added to the graph earlier since the number of options outnumbered k, may be restored and the corresponding edges may be added to the call graph. Execution may then continue on step 212 where the call graph is output.

If, however, such algorithm exists, then on step 224 the algorithm may be executed on one or more of the unresolved targets.

On step 228 the results of the second or further algorithm, e.g., the new edges, may be added to the graph, such that the graph may comprise edges created by different algorithms. However, in some embodiments, step 228 may be performed as part of the execution of the second or further algorithm.

The process may then return to step 208, for determining whether additional unresolved targets exist.

Figure 3:
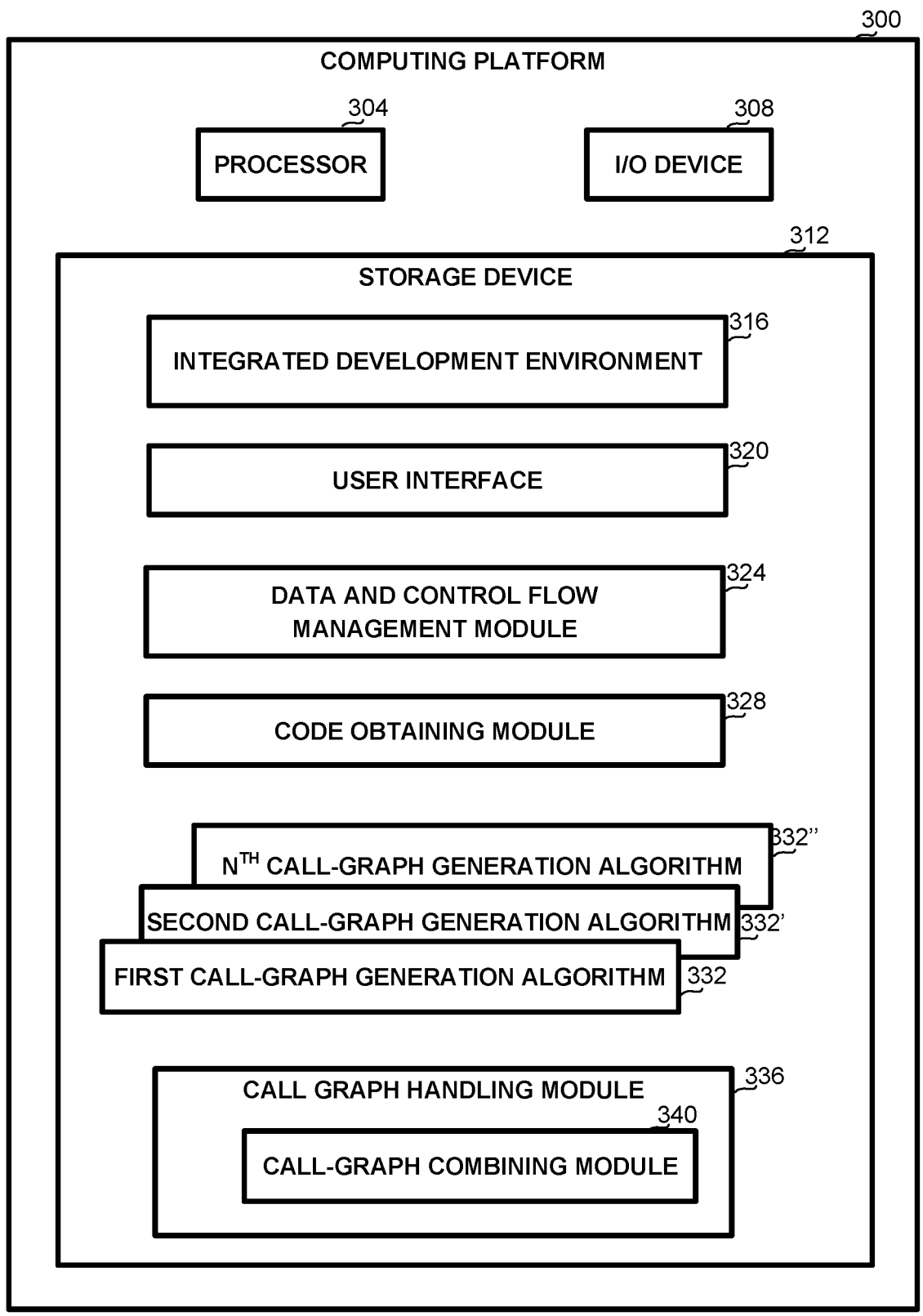
FIG. 3 shows a block diagram of a system for generating a call graph, in accordance with some exemplary embodiments of the subject matter.

Referring now to FIG. 3 showing a block diagram of a system generating a call graph, in accordance with some exemplary embodiments of the subject matter.

The system may comprise one or more computing platform 300, which may be for example a computing platform used by a developer. The system may be implemented as a stand-alone system, or as part of an Integrated Development Environment (IDE) implemented for example as a plug-in, as a web service, or the like.

In some embodiments, computing platform 300 may be implemented as a server providing services to a plurality of clients, connecting through any communication channel.

In some exemplary embodiments of the disclosed subject matter, computing platform 300 can comprise processor 304. Processor 304 may be any one or more processors such as a Central Processing Unit (CPU), a microprocessor, an electronic circuit, an Integrated Circuit (IC) or the like. Processor 304 may be utilized to perform computations required by the apparatus or any of it subcomponents.

In some exemplary embodiments of the disclosed subject matter, computing platform 300 can comprise an Input/Output (I/O) device 308 such as a display, a pointing device, a keyboard, a touch screen, or the like. I/O device 308 can be utilized to provide output to and receive input from a user. For example, the user can provide the value of k, select code segments upon which a call graph is to be generated, review the call graph, or the like.

Computing platform 300 may comprise a storage device 312. Storage device 312 may be a hard disk drive, a Flash disk, a Random Access Memory (RAM), a memory chip, or the like. In some exemplary embodiments, storage device 312 can retain program code operative to cause processor 304 to perform acts associated with any of the subcomponents of computing platform 300.

Storage device 312 can store the modules detailed below. The modules may be arranged as one or more executable files, dynamic libraries, static libraries, methods, functions, services, or the like, programmed in any programming language and under any computing environment.

Storage device 312 may store a programming development environment 316, also referred to as IDE designed for programming, compiling if required, executing and debugging program code. One or more of the modules below may be implemented as one or more components such as plug-ins for IDE 316, enabling a user to activate a call graph generation, provide parameters, and review the call graph of the code. Alternatively, one or more modules may be implemented as a separate executable which may be invoked by the user, or in any other manner and frequency.

Storage device 312 may store user interface 320 for displaying to a user or receiving from the user various aspects associated with the disclosure, such as a displaying a visual representation of the graph, displaying a tabular representation of the graph, or the like.

Storage device 312 can store data and control flow management module 324, for managing the control and data flow of the apparatus, such that modules are invoked at the correct order and with the required information. For example, data and control flow management module 324 can be configured to call the call-graph generation algorithms 332 detailed below for the relevant code segments or instructions, call a service or program to combine the call-graph from the sub graphs provided by the different algorithms, or the like.

Storage device 312 can store code obtaining module 328 for obtaining computer code from a user. The code may be received in any manner, such as read from one or more files, retrieved through a communication channel, or the like. Code obtaining module 328 can also be part of IDE 316 and may thus have access to the code.

Storage device 312 can store first call-graph generation algorithm 332, second call-graph generation algorithm 332', or the like until $n^{th}$ call-graph generation algorithm 332".

In some embodiments, first call-graph generation algorithm 332 may be a module implementing CHA, second call-graph generation algorithm 332" may be a module implementing type inference, and third call-graph generation algorithm 332''' may be a module implementing point-to analysis.

In some embodiments, first call-graph generation algorithm 332 may be a file dependency static analysis engine, second call-graph generation algorithm 332" may be a CHA engine, and third call-graph generation algorithm 332''' may be a type inference engine, that would solve code reachability. The file dependency static analysis engine may reduce the unreachable code for the CHA engine which examines static references between files. CHA may be performed over the reachable files only, and may provide a partial graph. CHA might resolve some call-sites in an imprecise way, i.e., provide a high number of targets for one or more nodes, or fail to fully resolve a target. This partial result is then completed by the accurate type inference algorithm. This combination takes advantage of the fast discovery of method dependencies using CHA, while achieving better precision by delaying discovery of method to the activation of the type inference algorithm.

In another embodiment, first call-graph generation algorithm 332 may be a name based call graph algorithm, which matches call sites with targets based on function name or signature only, while second call-graph generation algorithm 332" may be a point-to analysis or a dynamic algorithm operating during runtime.

It will be appreciated that storage device 312 may comprise any number and type of algorithms, and may determine which ones to activate at any given situation according to the case at hand. For example, for small portions of code, a highly accurate algorithm may be activated and may return an accurate graph within acceptable time. Larger portions of code dispersed over a large number of files may first be processed using the file dependency static analysis engine, followed by finer resolution algorithms, or the like. If the code compiles and executes, dynamic algorithms may be used in addition to or instead of the static ones.

Storage device 312 can store call graph handling module 336, for providing functionality related to call graphs. In a non-limiting example, call graph handling module 336 can implement functions for creating an initial call graph comprising only nodes from code, providing a visual representation of the graph, or the like. Functions of call graph handling module 336 may be called from user interface 320, from data and control flow management module 324, or other modules, which may or may not be associated with the system.

Call graph handling module 336 may comprise, in addition to all other functionality, call graph combining module 340 for receiving one or more edges from a second, third, or later-called algorithm, and combining the edges with a graph previously obtained using one or more coarser algorithms.

Call graph handling module 336 may also be an external module, such as a third party module.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   obtaining a representation of computer code;
   analyzing the computer code using a first algorithm to obtain a call graph;
   subject to the call graph not complying with a stopping criteria:
      analyzing a part of the computer code using a second algorithm to obtain further edges for at least one second node comprised in the call graph; and
      combining the further edges with the call graph, to obtain a second call graph; and
   outputting the second call graph.

2. The method of claim 1, wherein the stopping criteria is that the call graph comprises at least one first node associated with at least one resolved target and at least one second node associated with an unresolved target.

3. The method of claim 1, wherein the second algorithm requires more resources than the first algorithm.

4. The method of claim 1, further comprising:
   subject to the second call graph comprising at least one third node associated with an unresolved target:
      analyzing the computer code using a third algorithm to obtain additional edges for the at least one third node; and
      combining the additional edges with the second call graph,
         thereby obtaining a third call graph comprising the call graph, the further edges and the additional edges.

5. The method of claim 4, wherein the first algorithm is a class hierarchy analysis, the second algorithm is a point-to analysis and the third algorithm resolves dynamic method calls.

6. The method of claim 4, wherein the first algorithm is a file dependency analysis, the second algorithm is a type inference analysis and the third algorithm is a point-to analysis.

7. The method of claim 1, wherein the first algorithm is a file dependency static analysis, name-based analysis or class hierarchy analysis.

8. The method of claim 1, wherein the first algorithm or the second algorithm is a class hierarchy analysis.

9. The method of claim 1, wherein the second algorithm is dynamic analysis or point-to analysis.

10. The method of claim 9, wherein the third algorithm is a type inference analysis or dynamic analysis.

11. A computerized apparatus having a processor, the processor being configured to perform the steps of:
obtaining a representation of computer code;
analyzing the computer code using a first algorithm to obtain a call graph;
subject to the call graph not complying with a stopping criteria:
analyzing a part of the computer code using a second algorithm to obtain further edges for at least one second node comprised in the call graph; and
combining the further edges with the call graph, to obtain a second call graph; and
outputting the second call graph.

12. The apparatus of claim 11, wherein the stopping criteria is that the call graph comprises at least one first node associated with at least one resolved target and at least one second node associated with an unresolved target.

13. The apparatus of claim 11, wherein the second algorithm requires more resources than the first algorithm.

14. The apparatus of claim 11, wherein the processor is further configured to:
subject to the second call graph comprising at least one third node associated with an unresolved target:
analyze the computer code using a third algorithm to obtain additional edges for the at least one third node; and
combine the additional edges with the second call graph,
thereby obtain a third call graph comprising the call graph, the further edges and the additional edges.

15. The apparatus of claim 14, wherein the first algorithm is a class hierarchy analysis, the second algorithm is a point-to analysis and the third algorithm resolves dynamic method calls.

16. The apparatus of claim 14, wherein the first algorithm is a file dependency analysis, the second algorithm is a type inference analysis and the third algorithm is a point-to analysis.

17. The apparatus of claim 11, wherein the first algorithm is a file dependency static analysis, name-based analysis or class hierarchy analysis.

18. The apparatus of claim 11, wherein the first algorithm or the second algorithm is a class hierarchy analysis, dynamic analysis or point-to analysis.

19. The apparatus of claim 14, wherein the third algorithm is a type inference analysis or dynamic analysis.

20. A computer program product comprising a computer readable storage medium retaining program instructions, which program instructions when read by a processor, cause the processor to perform a method comprising:
obtaining a representation of computer code;
analyzing the computer code using a first algorithm to obtain a call graph;
subject to the call graph not complying with a stopping criteria:
analyzing a part of the computer code using a second algorithm to obtain further edges for at least one second node comprised in the call graph; and
combining the further edges with the call graph, to obtain a second call graph; and
outputting the second call graph.

* * * * *